July 26, 1955 M. T. KENNEDY, JR., ET AL 2,714,080

TANK CLEANING DEVICE AND METHOD

Filed Dec. 31, 1952 5 Sheets-Sheet 1

INVENTORS:
MERRITT T. KENNEDY JR.
LAMONT F. DEWALD
BY
Emery Varney Whittemore & Dix
ATTORNEYS:

FIG. 4.
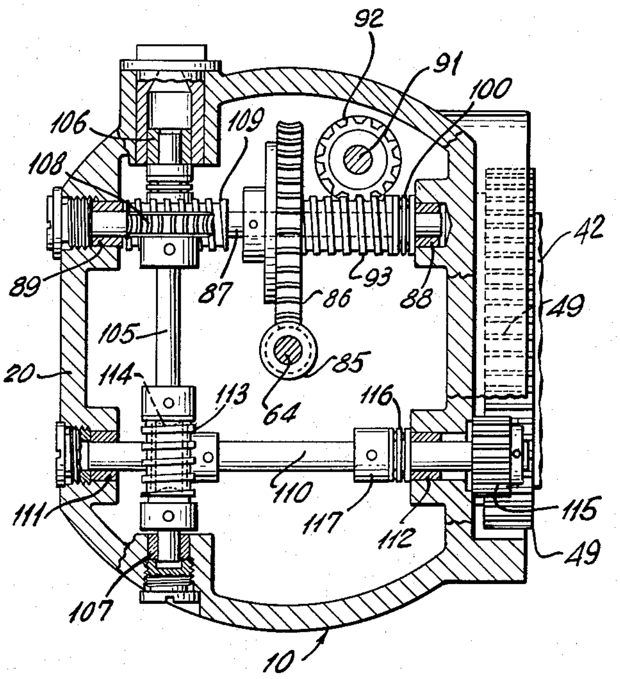
FIG. 5. FIG. 6.
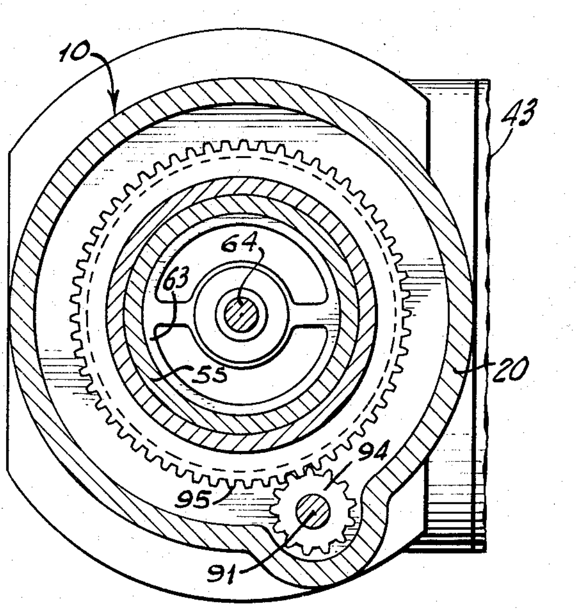
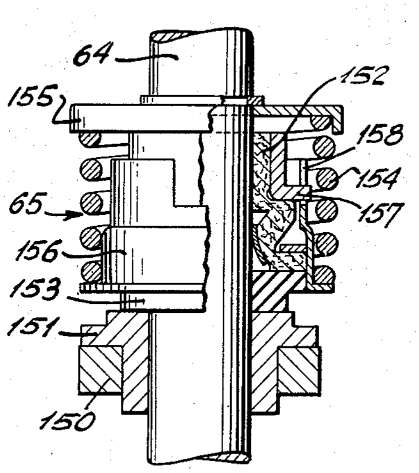
INVENTORS:
MERRITT T. KENNEDY, JR.
LAMONT F. DEWALD
BY
Emery Varney Whittemore & Dix
ATTORNEYS:

TANK CLEANING DEVICE AND METHOD

Filed Dec. 31, 1952 5 Sheets-Sheet 3

INVENTORS:
MERRITT T. KENNEDY JR.
LAMONT F. DEWALD
BY Emery Varney Whittemore + Dix
ATTORNEYS:

July 26, 1955 M. T. KENNEDY, JR., ET AL 2,714,080

TANK CLEANING DEVICE AND METHOD

Filed Dec. 31, 1952 5 Sheets-Sheet 4

INVENTORS:
MERRITT T. KENNEDY JR.
LAMONT F. DEWALD
BY
Emery Varney Whittemore & Dix
ATTORNEYS INVENTORS:
MERRITT T. KENNEDY, JR.
LAMONT F. DEWALD
BY
Emery Varney Whittemore + Dix
BY ATTORNEYS:

United States Patent Office 2,714,080

Patented July 26, 1955

2,714,080

TANK CLEANING DEVICE AND METHOD

Merritt T. Kennedy, Jr., Port Washington, and Lamont F. De Wald, Great Neck, N. Y., assignors to Pyrate Sales, Inc., Bayside, N. Y., a corporation of Nevada Application December 31, 1952, Serial No. 328,886

18 Claims. (Cl. 134—24)

The present invention relates to the art of washing tanks, which have been employed in the shipment and storage of such materials as oil, chemicals, wines, milk, and other liquids, or semi-liquids, or products that leave residues. As examples of some of the shipping and storage conveyances and tanks are, tramp ships, oil tankers, tank cars, milk tanks, wine casks, and the like.

As a particular example for descriptive purposes, reference is made to the condition after the unloading or draining of a tank containing such materials as petroleum oil and similar substances, where some of this material remains on the walls, tops, and bottoms of the tank and must be cleaned or washed off to prevent contamination of the next tank charge. The extent of necessary washing or cleaning depends on the nature of the material previously in the tank and the nature of the material to be loaded in the tank.

One type of a mechanical washing device commonly employed for the purposes, comprises an improved turret construction in the form of a housing for having attached thereto or included therein, a motor for power development and transmission. The preferred housing is mounted for rotation about a vertical axis, and a nozzle device is carried by the turret or housing for rotation therewith about the vertical axis of the turret, and itself is mounted on the turret for rotation about an axis that is usually horizontal or at some angle to the vertical axis. The housing and the nozzle device are preferably hydraulically driven at predetermined related rates by the energy of the cleaning stream in its passage through the turret. This cleaning stream is discharged through the nozzle device and impinges as a high velocity jet against the tank walls and surfaces to be cleaned.

In operation, the washing device is lowered or inserted into the tank to be washed through a suitable hole, usually in the top wall, and the cleaning liquid is fed through said device. The cleaning operation may be started with a nozzle pointing upward, assuming that the top is to be cleaned. As the turret or main housing rotates about its vertical axis or pivot hub, the nozzle device moves with said turret and at the same time itself rotates about its horizontal axis, thereby projecting a high velocity cleaning jet against the tank walls, and surfaces, following a helical impingement stripe pattern around the top, side and bottom tank wall surfaces. The term "helical" is used herein in a broad sense, since the tank may be of rectangular or other shape.

A general object of the invention is to provide a new and improved method of cleaning the tank wall surfaces, and to provide a new and improved tank cleaning device of the general character referred to for carrying out this method.

A more specific object or feature of the invention is to provide a tank cleaning device of the general character referred to having means permitting effective lubrication of the movable transmission parts of the device and at the same time protectively sealing those parts against the erosive or destructive action of the cleaning liquid being employed, and to maintain the lubricant within the transmission chambers.

Another object or feature is to provide a new and improved tank cleaning device of the general character referred to having safety means associated with some of its movable transmission parts to prevent breakage of these parts when any of the parts may become blocked against rotation.

A further feature of the improved invention is to provide a tank cleaning device of the general character referred to, having a multiple nozzle device of new and improved construction and to provide a drive therefor, and with its nozzles arranged to permit a more uniform coverage of the walls to be cleaned than has heretofore been possible for every complete turn or cycle of the nozzle device about its horizontal axis.

Another desirable feature of this invention is the provision of a novel cleaning device that is so constructed and operated that it will give a relatively quick and good and substantially uniform coverage of all of the surfaces of the walls of the container being cleaned. Such a substantially uniform coverage allows for relatively quick cleaning that is sufficient for the cleaning of some materials in the tank or container. When it is desired to further clean, as when there are still considerable residue materials on the walls, then the device is continued in operation and the impinging cleaning fluid strikes directly on areas that were formerly cleaned by the "wash down" fluid or liquid during the first operation of the device.

Another object of the invention is to provide a novel method of cleaning a tank in accordance with a new and improved jet wall impingement pattern. To carry out this object, the helical jet impingement stripes or paths throughout the tank walls during each turn of the nozzle device about its horizontal axis are substantially uniformly distributed throughout the tank wall surfaces and have a pitch the distance between the centers of successive stripe convolutions small enough to permit effective cleaning coverage of the tank walls for each turn of the nozzle device about its horizontal axis, and the jet impingement stripes for each turn of the nozzle device about its horizontal axis are offset with respect to and cut in between the jet impingement stripes produced by previous turns of the nozzle device about its horizontal axis, whereby with successive turns of the nozzle device, progressively wider and more complete coverage of the tank walls by the jet impingement stripes is effected. This method lends itself to cleaning control according to the degree of cleaning required. For example, with certain types of material, one pass over the walls may be sufficient to remove the residue material therefrom. With materials of more stubborn wall adherence, a number of passes may be necessary, each pass covering by jet impingement, different areas of the walls except for stripe overlaps.

Another object of the invention is to provide a tank cleaning device of the general character referred to for carrying out the aforesaid method by which the new and improved wall jet impingement pattern is carried out.

A further feature of the invention is to so construct the improved apparatus to obtain the novel cleaning pattern upon all the surfaces of the tank by providing different ratios of drives for the turret about its vertical axis in relation to the different speed drive for the nozzles which guide the impinging cleaning fluid against the surfaces of the tank. This improved type of structure allows the cleaning streams to impinge on new surface areas until the device (turret and nozzles) have gone through the maximum number of turns before returning to their exact original positions, and in this instance, the turret will have gone through approximately 7,000 turns.

For the purpose of obtaining the novel cleaning pattern on the surfaces of the tank, the turret or main housing will rotate a definite number of times, and by reason of the particular drive ratios, the nozzle, or nozzles, will rotate a less number of turns, by fractions.

In the description following, the housing will be said to have made a whole, or integer, or a complete entity, number of turns (not a fractional or mixed number of turns), while the nozzles will be said to make a mixed number of turns, which "mixed" number is defined as the sum of an integer or whole or complete number and a fraction.

Various other objects and features of the invention are apparent from the following particular description and from inspection of the accompanying drawings, in which:

Fig. 1 is a longitudinal section of the tank cleaning device embodying the present invention;

Figs. 2, 3, 4 and 5 are transverse sections of the tank cleaning device taken on lines 2—2, 3—3, 4—4 and 5—5 respectively of Fig. 1;

Fig. 6 is a shaft seal device for the shaft of the water motor of the tank cleaning device, shown partly in vertical section and partly in elevation;

Figure 15:
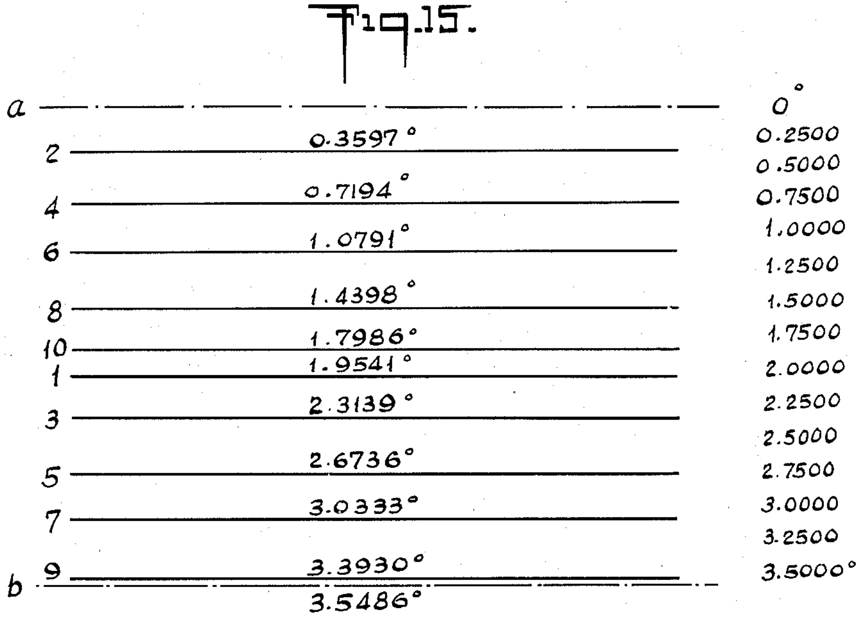
Figure 16:
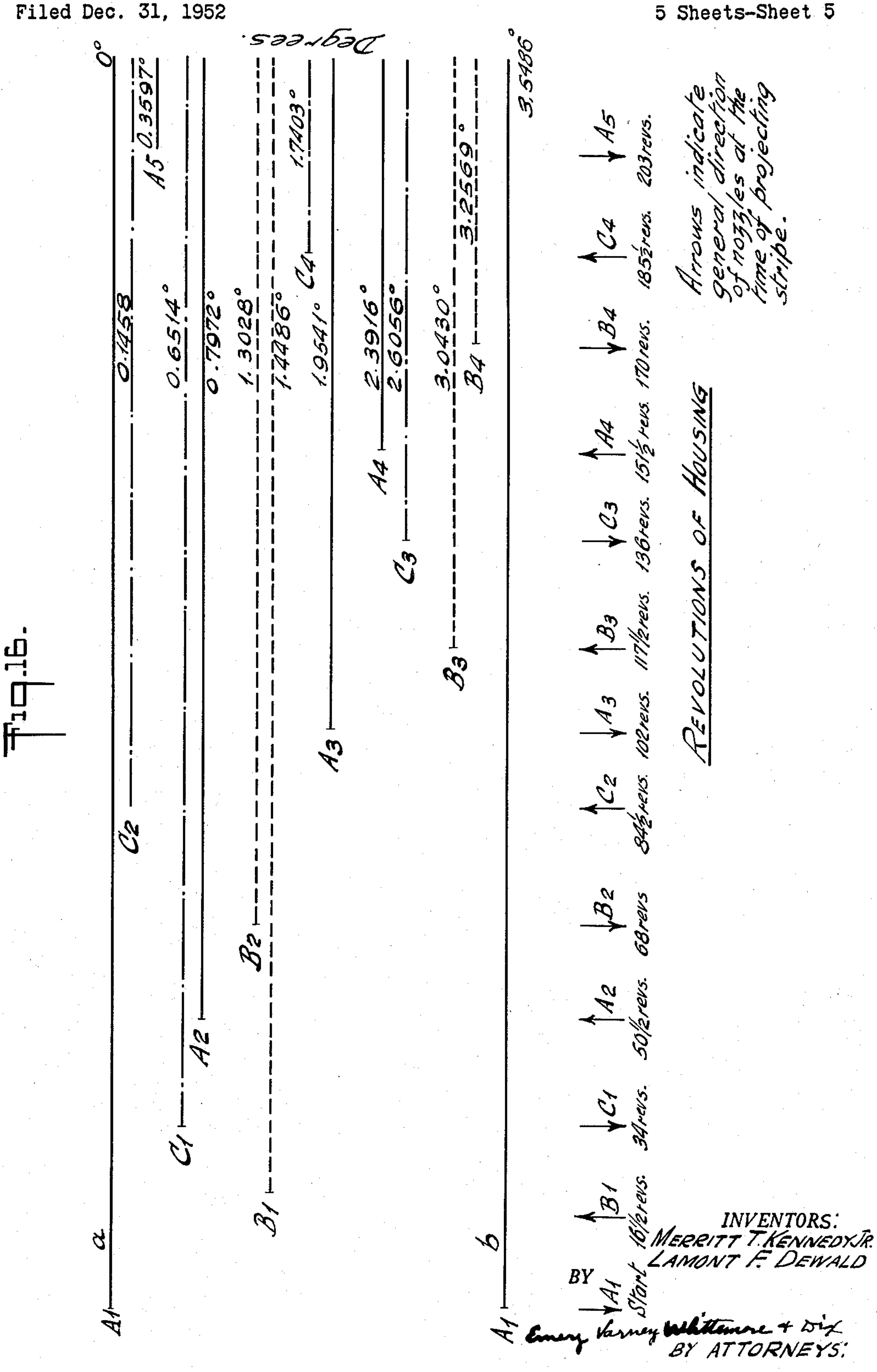

Fig. 15 is a diagram showing the generation of the center lines of the jet impingement stripes of a single nozzle on a predetermined area of the tank wall corresponding in width to the pitch of the helical stripe convolutions projected upon said wall, for successive turns of said nozzle about its horizontal axis while the housing revolves about its vertical axis; and Fig. 16 is a diagram showing the generation of the center lines of the jet impingement stripes of all of the nozzles on a predetermined area of the tank wall surfaces corresponding in width to the pitch of the helical stripe convolutions projected upon said wall by any single nozzle.

Figures 1, 2, 3:
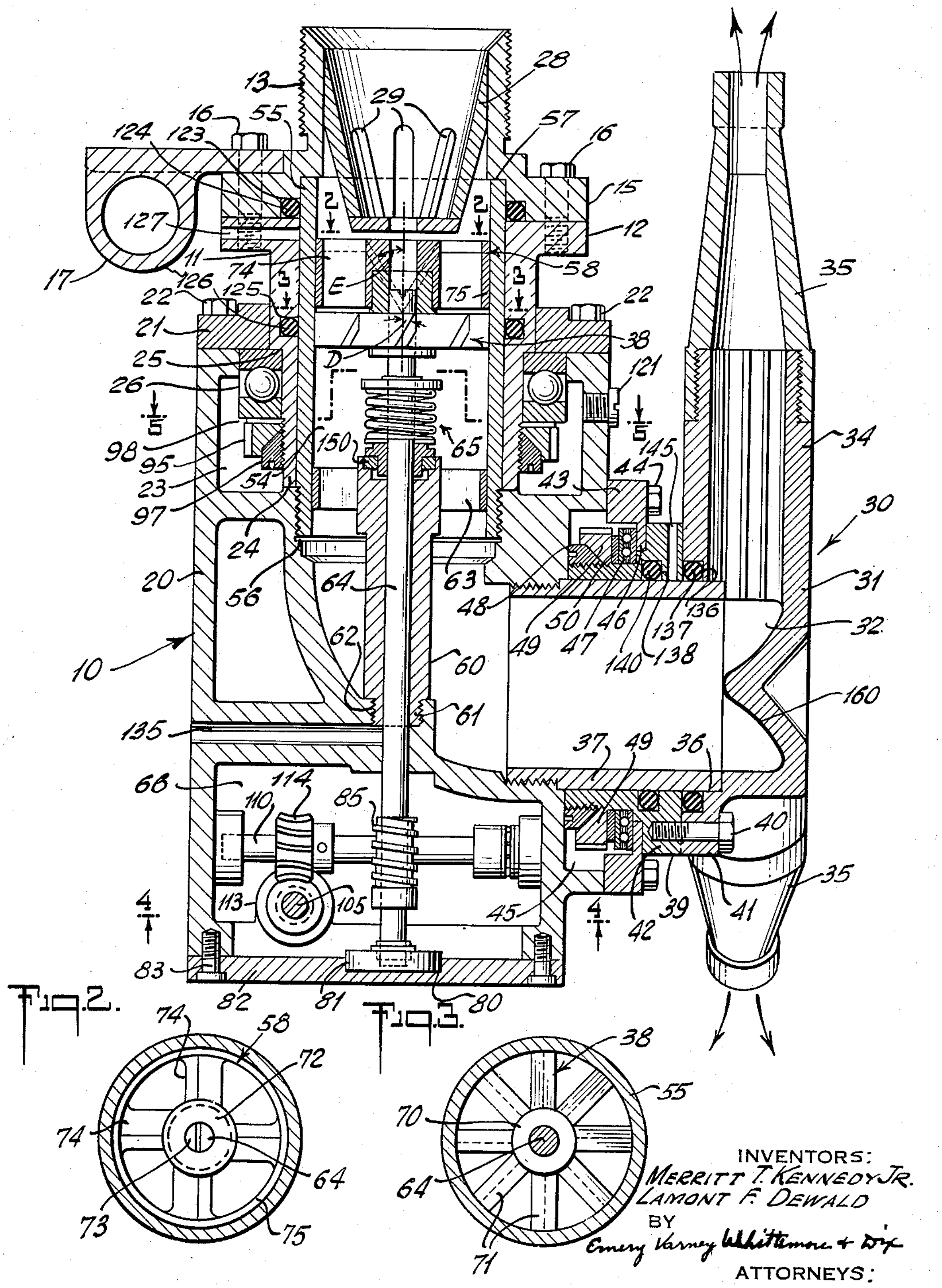
Figures 7, 8, 9, 10, 11, 12:
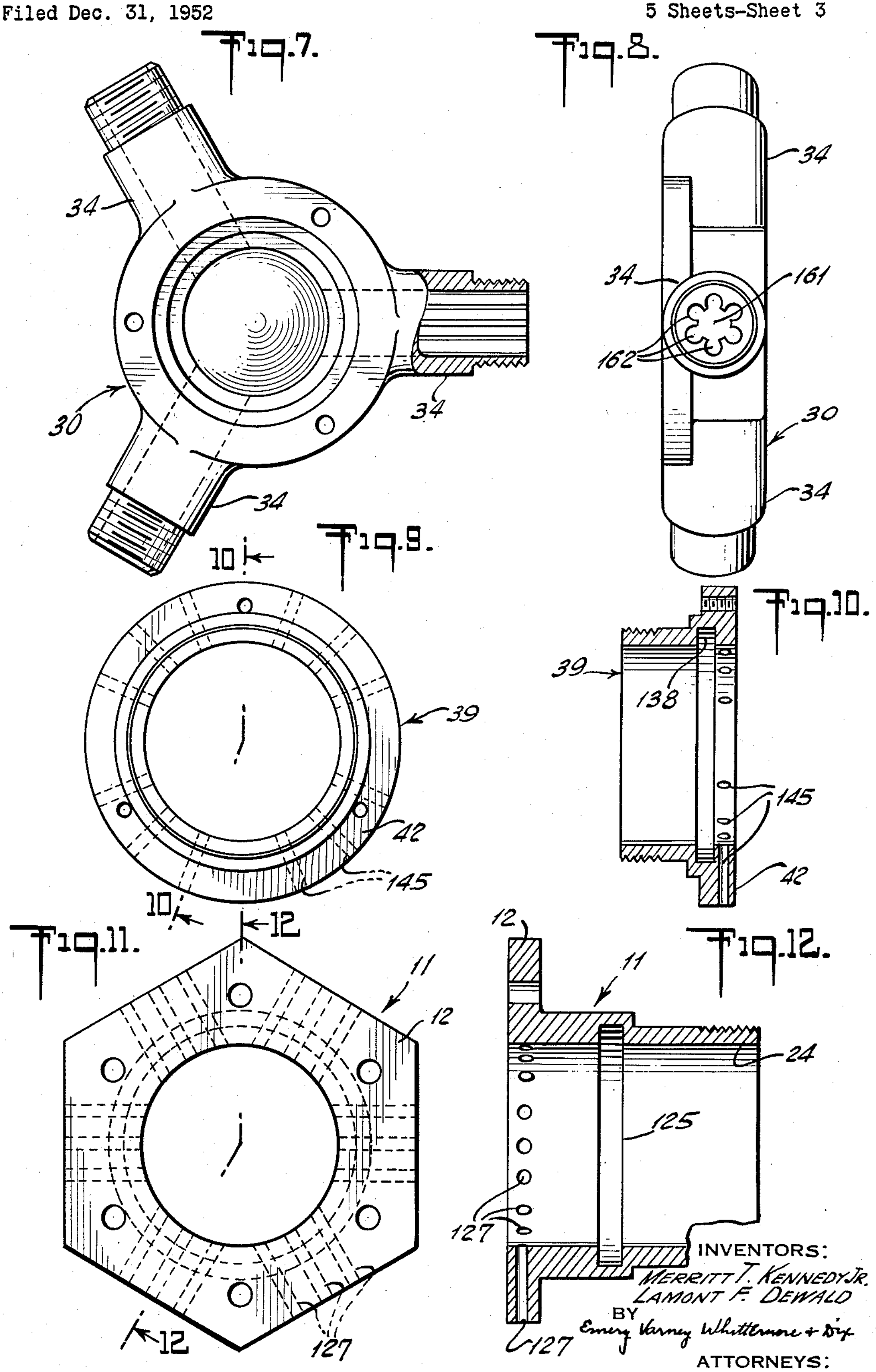
Fig. 7 is a front elevation partly in section of the nozzle carrier.
Fig. 8 is a side elevation of the nozzle carrier.
Fig. 9 is a front elevation of the hub for the nozzle carrier.
Fig. 10 is a radial section of the hub for the nozzle carrier, taken on lines 10—10 of Fig. 9.
Fig. 11 is a top plan view of the top collar serving as a vertical pivot for the turret or housing in its rotation about a vertical axis.
Fig. 12 is a section of the top collar taken on lines 12—12 of Fig. 11.
Figure 13:
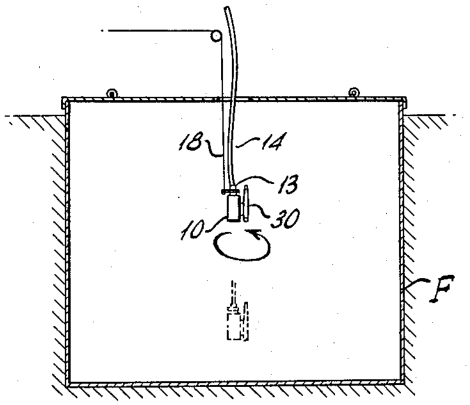
Fig. 13 is a diagram partly in side elevation and partly in section showing the possible positions of the tank cleaning device in a tank; and the arrow shows the preferred direction of rotation of the housing.

Referring to Fig. 1 of the drawings, the tank cleaning device of the present invention as herein illustrated comprises a turret 10 in the form of a suitable housing, supported in the manner to be described for rotation about a top collar 11, Figs. 1, 11 and 12, which serves as a vertical pivot for said housing and which is provided with a top annular flange 12. Seated on and secured to the top of this collar 11 is a cleaning liquid inlet 13—Fig. 1—which is externally threaded to receive a coupling (not shown) for a hose 14—Fig. 13—through which cleaning liquid, such as sea water, or the like, may be delivered under pressure from a pump (not shown), and which inlet 13 is provided with a base flange 15. The liquid inlet 13 is secured to the collar 11 by means of screw studs 16 passing through the flanges 12 and 15. Secured to the base flange 15 of the liquid inlet 13, as for example, by two or more of these screw studs 16, is a rope hanger 17 for a rope 18 (Fig. 13). The support of the device is mainly through the hose 14 coupled to the liquid inlet 13, the rope 18 attached to the hanger 17 being simply for the sake of precaution, and to tow the device sideways in the tank towards any selected part of the wall requiring more intense cleaning.

The housing 10 when including the operating apparatus within its confines comprises a main frame 20 (Figs. 1, 4 and 5) with a top cover plate 21 secured thereto, as for example, by screw studs 22, to define with parts of said frame a chamber 23 and embracing the collar 11 with a snug rotative fit for bearing rotation thereabout. The collar 11 has a diametrically reduced lower skirt section 24 defining an axially facing annular cover plate 21 against which abuts the upper race of a ball bearing unit 26 sealed in the chamber 23. The housing 10 thereby rotates freely about the collar 11 when driven in the manner to be described.

The cleaning liquid may, for example, be sea water, especially in the case of an oil tanker, in which case it is desirable to screen out the debris or other foreign matter that may clog up the cleaning device. For that reason, there is provided a screen 28 in the form of a perforated conical cup retained in the liquid inlet 13 in any suitable manner, as for example, by press-fitting. This screen 28 is shown perforated by a series of elongated holes 29 extending along the conical wall thereof.

Supported on the housing 10 for rotation therewith about a vertical axis and for rotation about a usually horizontal axis, is a nozzle device 30 (Figs. 1, 7 and 8) comprising a nozzle carrier 31 having its eye 32 defining a manifold chamber, from which radiate, in this instance, three nozzles 34 arranged 120° apart and threadedly carrying respective nozzle tips 35. This nozzle eye 32 has an annual recess 36 to receive a horizontal outlet support tube 37, which has one end open into the manifold nozzle chamber 32 and at its other end open into the outlet side of a water motor 38, to be more fully described. This support tube 37 is desirably fixed with respect to the housing 10, as for example, by press-fitting or otherwise attached, which may be by screw threads, if desired, to thereby serve as a pivot support for the nozzle device 30 in its rotation about a horizontal axis. The nozzle carrier 31 has a hub 39 (Figs. 1, 9 and 10) affixed thereto, as for example, by studs 40 passing through a flange 41 on said carrier and a flange 42 on said hub, and embracing said outlet tube 37 with a snug rotative fit for support thereon. A side holder plate 43 (Fig. 1) secured to the side of the housing, as for example, by studs 44, forms with a wall of the housing frame 20 a sealed oil or grease chamber 45 and has an inwardly extending flange or lip 46, projecting between the hub flange 42 and a thrust bearing unit 47 embracing the hub 39. This thrust bearing unit 47 is held against the lip 46 of the plate 43 by a collar 48 threaded on the hub 39 and bearing against a spur gear 49 on said hub housed in the oil or lubricating chamber 45, this gear in turn bears against the bearing unit 47 through a spacer 50, so that the nozzle device 30 is retained against axial displacement on the support tube 37. Preferably, the collar 48 forms a slip clutch connection between the hub 39 and the gear 49 for the purpose to be described, and this gear forms part of the drive transmission to the nozzle device 30, as will be more fully described.

The drive for the housing 10 and the nozzle device 30 includes the water motor 38 (Figs. 1 and 3) shown in the form of a turbine of the parallel or approximately axial flow type rotatable in a fixed tubular casing 55 forming the inlet tube for said turbine and defining a vertical flow passageway 54 through said housing. This tubular casing 55 is embraced by the collar 11 and the base of the liquid inlet 13 and is retained against axial movement in any suitable manner as by threading, or by butting against a shoulder 56 in the housing frame 20. On the inlet side of the turbine 38 there is a fixed guide 58 (Figs. 1 and 2) adapted to direct the stream of water in the proper direction against the turbine vanes of the water motor to obtain the maximum power from the turbine with minimum of turbulence, as will be more fully described.

For supporting the turbine 38 in the inlet tube or casing 55, there is provided a tubular member 60 (Fig. 1) having its lower end 61 of reduced diameter threaded into a hole 62 in the housing frame 20 for support thereon, and having at its upper end a round head 63 of open construction to permit free flow of the fluid therethrough, and having engagement with the wall of said casing to hold said tubular member against lateral displacement. Extending through the tubular member 60 with a snug rotative fit is a turbine shaft 64, and extending around said shaft and between this tubular member and the turbine 38 is a suitable bellows shaft seal 65 to be more fully described, serving to prevent leakage of the cleaning liquid along said shaft and into a lower oil or grease chamber 66, housing part of the transmission to the housing 10 and to the nozzle device 30.

The turbine 38 comprises a hub 70, Fig. 3, affixed to the shaft 64 and a plurality of vanes 71, Fig. 3, connected to said hub and each being turned about its longitudinal or radial axis at an angle of about 30° with an axial plane passing through said vane, as indicated by the angle D in Fig. 1.

The guide 58 (Figs. 1 and 2) comprises a hub 72 with a center hole 73 to permit the upper end of the turbine shaft 64 to extend thereinto with a rotative fit, and a series of vanes 74 between said hub and a rim 75. Each of said vanes extends at an angle of about 45° with an axial plane passing through said vane, as indicated by the angle E in Fig. 1. As a result of the arrangement of the vanes in the guide 58 and the turbine 38, the liquid discharging from the guide 58 is directed at an angle of 75° with the plane of the turbine vanes, thereby rotating said turbine not only by the reaction of the turbine to the liquid passing therethrough, but also by the impulse of the liquid upon said turbine blades.

The lower end of the turbine shaft 64 extends into a bearing unit 80 (Fig. 1) set in a recess 81 of a cover plate 82 secured to the lower end of the housing 10, as for example, by studs 83, and defining with certain parts f the housing frame 20 the oil or grease chamber 66.

The drive transmission between the turbine shaft 64 on the one hand, and the housing 10 and nozzle device 30 on the other hand, includes a worm 85 (Figs. 1 and 4) on the shaft 64 meshing with a worm wheel 86 on a shaft 87 journalled at one end in a bearing 88 formed in one wall of the housing frame 20, and journalled at its other end in a bearing unit 89 secured to an opposite wall of said housing frame. The drive between this shaft 87 and the housing 10 includes a vertical shaft 91 (Figs. 4 and 5) journalled in suitable bearings (not shown), at least one of which is formed in the frame structure 20 of the housing 10 to cause this housing 10 to rotate about a vertical axis by the movement of said vertical shaft bodily around said axis. The lower end of the vertical shaft 91 carries a worm wheel 92 in mesh with a worm 93 affixed to the shaft 87 and the upper end of this shaft 91 carries a pinion 94 meshing with a spur gear 95, Fig. 5. This spur gear 95, in the form of a ring, embraces the fixed skirt 24 of the top pivot collar 11 and is yieldably secured thereto against rotation during normal operations by a suitable slip clutch. This clutch is shown as comprising cone 97 in the form of a ring keyed or otherwise affixed to the fixed collar skirt 24 against rotation and having a conical friction engagement with the spur gear 95. This clutch cone 97 is preferably threaded on the collar skirt 24 and faces against the gear 95, which in turn is held against the lower race of the bearing unit 26 through a spacer 98, Fig. 1.

By means of the drive so far described, the operation of the turbine 38 drives the turbine shaft 64, and this in turn drives the shaft 87, Fig. 4, through the reduction gearing 85 and 86. The shaft 87 in turn drives the vertical shaft 91 through the reduction gearing 92 and 93, and this causes the pinion 94, Fig. 5, to rotate. Since the spur gear 95 meshing with this pinion 94 is held against rotation by the friction clutch 97, this pinion 94 will rotate about the spur gear 95 epicyclically, causing thereby the housing 10 to rotate about a vertical axis around the collar 11 as a pivot pin.

If for any reason, the housing 10 in its rotation should encounter interference blocking its rotation, the clutch engagement between the spur gear 94 and the clutch cone 97 will slip, permitting thereby the spur gear to rotate, and the housing 10 to remain stationary. This prevents breakage of parts due to such blocking action.

There is an axial thrust on the shaft 87, which is resisted by a thrust bearing 100 between the worm 93 on said shaft 87 and a wall of the housing frame 20. The drive between this shaft 87 and the nozzle device 30 comprises a shaft 105 journalled at its ends in bearings 106 and 107 supported in opposite walls of the housing frame 20 and carrying a worm wheel 108, Fig. 4, in mesh with a worm 109 on the shaft 87, whereby said shaft 105 is driven from the shaft 87 at a reduced rate. A shaft 110 journalled in bearings 111 and 112 supported on opposite walls of the housing frame 20 is driven from the shaft 105 through a worm 113 on said shaft 105 meshing with a worm wheel 114 on said shaft 110, Figs. 1 and 4. One end of this shaft 110 projects beyond the corresponding bearing wall of the housing frame and carries on its projecting end a pinion 115 in the oil chamber 45 meshing with the spur gear 49.

Since the spur gear 49 is connected to the nozzle hub 39 through the collar 48, the nozzle device 30 is rotated about the horizontal outlet support tube 37 at the same time the housing 10 is rotated about its vertical pivot 11. Since this collar 48 forms a slip clutch connection between the spur gear 49 and the nozzle hub 39, any blocking of the nozzle device 30 against rotation, will cause this connection to slip, thereby preventing breakage of moving parts associated with said nozzle device.

There is an axial thrust on the shaft 110 which is resisted by a thrust bearing 116 on said shaft between a collar 117 affixed to said shaft and a wall of the housing frame 20.

The gears in the transmissions described are connected to shafts by shear pins, weak enough to break off when destructive resistance to the rotation of these parts is encountered, thereby supplementing the action of the slip clutches 48 and 97 in preventing breakage of these parts.

All moving parts of the power transmission except the turbine are enclosed in sealed chambers containing oil or grease, so that these parts are not only protected against liability of damage due to handling but are also effectively lubricated. Moreover, bleeder means are provided for draining cleaning liquid which has or might leak out of the flow path of said liquid, before said liquid reaches the moving parts of the power transmission in their lubricant chambers.

For example, the bearing unit 26 (Fig. 1) for the housing 10 in its rotation about the vertical pivot 11 and the pinion 94 and spur gear 95 forming part of the drive to said housing are enclosed in the sealed chamber 23 containing a suitable lubricant. One of the housing walls on one side of this chamber 23 has a hole for the charging of lubricant thereinto, this hole being normally closed by a screw plug 121.

The cleaning liquid coming in under high pressure will tend to leak along the annual juncture between the inlet tube turbine casing 55 on the one side and the inlet base flange 15 and the collar 11 on the other side, and eventually into the chamber 23. To prevent any such leakage into the oil or grease packed chamber 23, the inlet base flange 15 has an annual internal recess 123, Fig. 1, containing a sealing ring 124 of suitable packing material, as, for example, of Neoprene, known as an O' ring, and the collar 11 has an internal annual recess 125 (Figs. 1 and 12) containing a similar sealing ring 126. The flange 12 of the collar 11 has a series of radial bleed holes 127 just below the recess 123 to drain any liquid which may have escaped past the upper sealing ring 124. The lower sealing ring 126 blocks any liquid which may have escaped past the bleed holes 127.

Most of the transmission beyond the turbine shaft 64, aside from the gears 49 and 115 in the chamber 45, directly driving the nozzle device 30 about the horizontal support tube 37, and aside from the gears 94 and 95 in the chamber 23 directly driving the housing 10 about the pivot 11, are sealed in the chamber 66 containing suitable lubricant such as oil or grease. One of the side walls of this chamber 66 has a hole with a removable plug (not shown) as in the case of chamber 23, to permit the charging of this chamber with lubricant.

To prevent any cleaning liquid, which might leak along the turbine shaft 64 and along the threaded hole 62 in the housing frame 20 and into the sealed chamber 66, there is provided a bleed hole 135 leading from said hole to the outside of the housing 10.

To prevent cleaning liquid from leaking along the outside of the outlet nozzle support tube 37 and into the sealed chamber 45, the nozzle carrier 31 in the periphery of its eye 32 has a recess 136 receiving a sealing ring 137 similar to the sealing rings 124 and 126, and the nozzle hub 39 has a recess 138 (Figs. 1, 9 and 10) in its inner periphery containing a sealing ring 140 similar to the sealing rings 124 and 126. The flange 42 of this hub 39 has a series of radial bleed holes 145 to drain any leakage which finds its way past the sealing rings 137 and 140. These sealing rings 137 and 140 also act to keep the lubricant in the compartments 45 and 23.

The bellows shaft seal 65, Fig. 6, for the turbine shaft 64 is of suitable well-known construction, but is shown for the purpose of illustration in Figs. 1 and 6 as comprising a sealing ring 150, preferably of Neoprene material, set in fixed position in a recess in the upper end of the turbine support 60, and a collar 151, preferably of Monel alloy or of a ceramic material, embracing said shaft and seated, preferably by pressing, on said ring with a sealing rotative fit, and a spring-pressed metal bellows encircling the shaft and pressing a ring 153, preferably of graphite composition, or of rubber construction, against the ring. This bellows comprises a flexible sleeve 152 of suitable packing material, embracing the shaft 64 with a sealing fit and secured at its bottom to the suitable disc or ring 153 bearing against the collar 151 with sealing pressure. A spring 154 encircling the sleeve 152, has one end bearing against a flange 155 affixed to the shaft 64 and its other end bearing against a protective housing 156 for the sleeve 152 secured to the ring or disc 153. This housing 156 is guided for yieldable non-rotative movement along the shaft 64 by fingers 157 secured to the flexible sleeve 152 and projects into respective slots 158 in the housing 156.

The nozzle device 30 with its three nozzles is provided in its eye 32 with a deflector 160 (Fig. 1) contoured to divide the incoming main stream of liquid with minimum of turbulence into three smaller streams for discharge as high velocity radial jets from respective nozzle tips 35 on the nozzles 34. These nozzles 34 are constructed to cause any turbulence in the streams passing therethrough to be smoothed out before discharge therefrom. For that purpose, each of these nozzles 34 has a large axial bore 161 (Figs. 1, 7 and 8) and a series of smaller bores 162 (six being shown), arranged around and communicating with said center bore on their radially inner sides in the form of a multifoilated design. To assure flow through the nozzles 34 with the creation of a minimum of eddies and turbulences, the interior surfaces of the nozzles are smooth, and for that purpose the nozzles are preferably made of solid stock, and each is drilled to produce the outside bores 162 and then centrally drilled to produce the center bore 161.

In the operation of the cleaning device described, the device with a hose connection 14 (Fig. 13) leading from a suitable pump (not shown) and connected to the water inlet 13 is inserted in the tank in any suitable manner, as by lowering through an opening generally in the top wall of a tank to be cleaned, as shown in Fig. 13, until the device reaches, or is placed, in one of several positions. The cleaning liquid, which may be heated sea water, or a liquid with a detergent in it, is then delivered to the water inlet 14, and the operation started, assuming one nozzle 34 pointing vertically upward and assuming that the top of the tank requires cleaning, and the other two nozzles 34 pointing obliquely downward at an angle of 120° with each other and with the upwardly turned nozzle.

The cleaning liquid is then turned on, and this causes the housing 10 to rotate about its vertical axis and the nozzle device 30 to move bodily with said housing about the said vertical axis and at the same time to rotate about its own horizontal axis. With this type of structure each of the nozzle tips 35 thereby directs a high velocity impinging stream against the wall F to be cleaned, and the stream from each nozzle forms a helical impingement stripe.

The gear ratio between the drive to the housing 10 and the drive to the nozzle device 30 is such, that the housing makes a comparatively large number of revolutions about its vertical axis for each complete turn of a nozzle 34 about its horizontal axis, so that the pitch (i. e., the distance between the centers of successive helical stripe convolutions) is comparatively small. In this manner, it is assured that a sufficient number of impingement stripe convolutions will be generated on the surfaces of the tank to assure a somewhat effective cleaning of all of the walls or surfaces of the tank or bulkhead, even with a third turn of the nozzle device or structure 30 about its axis, assuming there are three nozzles. This cleaning action is effected not only by the action of direct jet impingement on the tank surfaces but also by the rundown of the cleaning liquid along the walls and across the spaces intervening between successive stripe convolutions. For certain types of cleaning, a single pass (i. e., one complete turn of the nozzle device 30), or even a turn of 60° of the nozzle device, may be sufficient.

For the reasons indicated, the drives to the housing 10 and to the nozzle device 30 may be so geared, that the housing makes at least 25 revolutions about the vertical axis for every complete turn of the nozzle device. In the specific form shown, the cleaning device is so geared, as to cause the housing 10 to revolve about 100 times for each turn of the nozzle device 30 about its horizontal axis.

In accordance with the present invention, not only is the drive geared to give a comparativly large number of revolutions of the housing 10 about its vertical axis for every complete turn of the nozzle device 30 about its own horizontal axis as described, but the different gear ratios are such, that when a considerable whole (integer) number of revolutions of the housing 10 about the vertical axis are completed, the nozzle device will have made a mixed number of turns (one plus a small fraction) and, therefore, will be slightly out of step with respect to its original starting position. Under these conditions, the jet impingement stripe pattern on the tank surfaces during the next turn of the nozzle device 30 will not be a superposed registering repeat of the first impingement pattern but will be displaced out of phase with respect to said first impinging pattern. This assures coverage of a different area of the tank wall surfaces by jet impingement during the second pass, thereby assuring a more complete cleaning operation. These phase offsets in the position of the nozzle device 30 for successive turns of the nozzle structure are repeated for successive turns of said nozzle device or structure, to cause the jets to impinge different wall or surface areas for these successive turns, until a comparatively large number of turns of the nozzle device are made, whereupon the nozzle device returns to its original rotative position about its horizontal axis, with respect to the rotative position of the housing 10 about its vertical position. Thereafter the jet impingement pattern is repeated.

To accomplish the phasic offsetting of the jet impingements upon the tank wall surfaces as described, the speed ratio between the gears 94 and 95 directly driving the housing 10 about the vertical pivot 11 is slightly different than the speed ratio between the gears 115 and 49 directly driving the nozzle device 30 between its horizontal support 37. In the specific form shown, the two pinion gears 94 and 115 have the same number of teeth, but the spur gears 95 and 49 differ by one tooth, the gear 95 in the specific form of the invention illustrated having 69 teeth and the gear 49 having 70 teeth.

In the specific drive to the housing 10 illustrated, the speed ratio between the gears 85 and 86 is 50 to 1, the speed ratio between the gears 93 and 92 is 4 to 1 and the speed ratio between the gears 94 and 95 is 14 to 69, the gear 94 having 14 teeth and the gear 95 having 69 teeth.

In the specific drive to the nozzle device 30 illustrated, the speed ratio between gears 109 and 108 is 20 to 1, the speed ratio between the gears 113 and 114 is 20 to 1 and the speed ratio between the gears 115 and 49 is 14 to 70, the gear 115 having 14 teeth and the gear 49 having 70 teeth.

With these specific gear ratios, when the housing 10 has made 100 whole, or complete or integer number of revolutions about its vertical pivot 11, the nozzle device 30 has made $^{69}/_{70}$ (fraction) of a revolution about its horizontal support 37, and when the housing has made 102 whole revolutions about its vertical pivot, the nozzle device has made $1^{38}/_{7000}$ (mixed number) of turns about its horizontal support. In other words, for every 100 revolutions of the housing 10, the nozzle device 30 will be short of completing its full 360° turn about the horizontal support 37 by an amount equivalent to one tooth of the gear 49. Thus, the nozzle device 30 will not return to its initial or original rotative position about said horizontal support with respect to the rotative position of the housing 10, until the housing 10 has made 7000 revolutions, and the nozzle device 30 has made 69 revolutions about its horizontal support 37.

Figure 14:
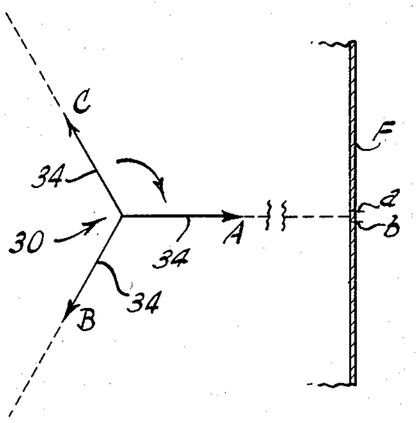
Fig. 14 is a diagrammatic view of the nozzle device structure and showing the impingement jet of a nozzle upon a predetermined area of the tank wall.

To indicate the impingement stripe pattern generated on the tank wall F and the phasic offsetting of the nozzle device 30 for successive turns about its horizontal support, there is illustrated in Fig. 14 the three nozzles 34, positions marked A, B and C, respectively, illustrated in a reference position with the nozzle A horizontal, the nozzle B extending obliquely downward and the nozzle C extending obliquely upward. The impingement pattern projected upon one of the tank walls or surfaces F by the nozzle A for successive turns of the nozzle device 30 is herein analyzed. This pattern is shown in Fig. 15.

With the specific gearing described above, one revolution of the housing 10 about the vertival pivot 11, causes the nozzle device 30 to turn 3.5486° about its horizontal support 37. In Fig. 15, the line *a* indicates the center line of the initial reference stripe created by impingement of the cleaning jet from the horizontal nozzle A (Fig. 14) in its horizontal reference position shown, and the line *b* represents the center line of the stripe projected upon the tank wall or surface F by the jet from the nozzle A after the housing 10 has rotated 360° about its vertical pivot 11, back to its reference position, the distance between the two lines *a* and *b* being equivalent to the length of a chord in the plane of the wall subtending an arc of 3.5486°.

At the end of 102 revolutions of the housing 10 about its pivot support 11, the nozzle A, will have made approximately a single complete turn about its horizontal support 37, but due to the difference of one tooth between the housing drive gear 95 and the nozzle drive gear (Fig. 1), this nozzle, will not be in exact registry with its original reference position shown in Fig. 14. Instead, the nozzle A will be offset from its original reference position by an amount equivalent to the turn of 1.9541° of the nozzle device 30, so that the jet from the nozzle A will create upon the tank wall F an impingement stripe, the center line of which is indicated by the line 1 in Fig. 15. It will be noted that the center line 1 of this stripe is substantially midway between the two stripe center lines *a* and *b* generated during the first turn of the nozzle A about its horizontal axis.

At the end of 203 revolutions of the housing 10 about its vertical pivot support 11 from its original position, after the nozzle A has made approximately two complete turns about its horizontal axis, this nozzle, will be phasically offset from its original horizontal reference position shown in Fig. 14 by an amount equivalent to the turn of 0.3597° of the nozzle device 30, so that the nozzle A will project a jet, the impingement stripe of which upon the tank wall F will have its center line indicated by the line 2 in Fig. 15. It should be noted that this jet impingement center line 2 cuts into the wall F between the lines *a* and 1.

At the end of 305 revolutions of the housing 10 about its vertical pivot support 11 from its original position, after the nozzle A has made approximately three complete turns about its horizontal axis, this nozzle will be offset from its original horizontal reference position shown in Fig. 14 by an amount equivalent to the turn of 2.3139° of the nozzle device 30, so that the center line of the jet impingement stripe projected from the nozzle A upon the tank wall F, indicated by the line 3, will cut in between the center lines 1 and *b*.

This offsetting of the center lines of the jet impingement stripes projected from the nozzle A upon any wall area corresponding in width to the pitch distance of the helical impingement stripe generated by said nozzle is continued for successive turns of the nozzle device 30 about its horizontal support 37, as shown in Fig. 15. This Fig. 15 indicates the stripe pattern for ten turns of the nozzle device 30 about its horizontal support 37, the center lines of the impingement stripes being indicated with respective whole, or complete, or integer, numbers corresponding to the sequence of turns, and with the number of degrees of offset of the nozzle A from its original reference position shown.

The nozzle device 30 does not return about its horizontal axis to its original reference position shown in Fig. 1 with respect to the rotative position of the housing 10 about its vertical axis, until the housing has completed 7000 revolutions and the nozzle device 30 has completed 69 turns about its horizontal axis. Thereafter, the jet impingement stripe pattern is repeated in superimposed registry over the first jet impingement stripe pattern.

It should be noted that the first impingement stripe center line 1 generated at the end of the first nozzle turn about the horizontal axis cuts substantially midway between the two successive stripe convolutions indicated by their center lines *a* and *b* and generated during the first pass or turn of the nozzle, and that at least for the next nine turns of the nozzle device 30 about its horizontal support 37, the successive center lines of the jet impingement stripes alternate on opposite sides of the center line 1.

In Fig. 15, the impingement stripe pattern for one nozzle for successive turns thereof is indicated. Fig. 16 shows the impingement stripe pattern generated by all three of the nozzles for a number of successive nozzle turns upon a wall area corresponding in width to the pitch of the helical stripe of conformations generated by each nozzle during each turn.

It should be noted from the diagram of Fig. 14, that while the nozzle device 30 is rotating clockwise, the nozzle A directs a stream against the tank wall F, generating first the stripe indicated by its center line *a* (Figs. 14 and 16) and then the next stripe indicated by its center line *b*, this nozzle turning generally downward through 3.5486° during this movement corresponding to a single revolution of the housing 10 about its vertical axis. After the housing 10 has made 16½ revolutions about the vertical pivot 11 from its reference position shown in Fig. 14, the nozzle B moving generally upward, will be directly in position to project its jet against the wall F between the lines *a* and *b*, Fig. 16. The center line of the stripe generated by the impingement jet against the wall F during this phase is indicated by the line $B_1$. This center line $B_1$ will be offset from the center line *a* by an amount equivalent to an angular displacement of 1.4486° of the nozzle from a horizontal reference position and, therefore, will cut in between the lines *a* and *b* substantially in midway position.

After the housing 10 has made 34 revolutions about the vertical pivot 11 from its reference position shown in Fig. 14, the nozzle C moving generally downward, will be directly in position to project its jet against the wall F between the lines *a* and *b*. The center line of the stripe generated by this impingement jet against the wall F during this phase is indicated by the line $C_1$. This center line $C_1$ will be offset from the center line *a* by an amount equivalent to an angular displacement of 0.6514° of the nozzle from a horizontal reference position, and, therefore, will cut in between the lines *a* and $B_1$ substantially in midway position.

After the housing 10 has made 50½ revolutions about the vertical pivot 11 from its reference position shown in Fig. 14, the nozzle A moving generally upward, will be in position to direct its jet against the wall F between the lines *a* and *b*. The center line of the stripe generated by the impingement jet against the wall F during this phase is indicated by the line $A_2$. This center line $A_2$ will be offset from the center line *a* by an amount equivalent to an angular displacement of 0.7972° of the nozzle from a horizontal position, and, therefore, will cut in between the lines $C_1$ and $B_1$.

After the housing 10 has made 68 revolutions about the vertical pivot 11 from its reference position shown in Fig. 14, the nozzle B moving generally downward, will be in position to direct its jet against the wall F between the lines *a* and *b*. The center line of the stripe generated by this impingement jet against the wall F during this phase is indicated by the line $B_2$. This center line $B_2$ will be offset from the center line *a* by an amount equivalent to an angular displacement of 1.3028° of the nozzle from a horizontal reference position, and, therefore, will cut in beween the lines $B_1$ and $A_2$.

After the housing 10 has made 84½ revolutions about the vertical pivot 11 from its reference position shown in Fig. 14, the nozzle C moving generally upward, will be in position to direct its jet against the wall F between the lines *a* and *b*. The center line of the stripe generated by this impingement jet against the wall F during this phase is indicated by the line $C_2$. This center line $C_2$ will be offset from the center line *a* by an amount equivalent to an angular displacement of 0.1458° of the nozzle from a horizontal reference position, and, therefore, will cut in between the lines $A_1$ and $C_1$.

After the housing 10 has made 102 revolutions about the vertical pivot 11 from its reference position shown in Fig. 14, the nozzle A having made approximately one complete revolution about its horizontal axis, will again be moving downward and will be in position to direct its jet against the wall F between the lines *a* and *b*. The center line of the stripe generated by the impingement jet against the wall F during this phase is indicated by the line $A_3$. This center line $A_3$ will be offset from the center line *a* by an amount equivalent to an angular displacement of 1.9541° of the nozzle from a horizontal reference position, and, therefore, will cut in between the line $B_1$ and *b*.

The impingement stripe diagram of Fig. 16 is continued for 203 revolutions of the housing A about its vertical pivot 11 corresponding to about two complete revolutions of the nozzle device 30 about its horizontal support 37. The abscissa of this diagram corresponds to revolutions of the housing 10 about its vertical axis. The letters with respective direction arrows along this coordinate correspond to the nozzles A, B and C which come into play at the different phases indicated to project their jets against the wall area between lines *a* and *b*, and the general directions of movement of the nozzles at these phases. The subscripts to these letters indicate the sequence of striping action of the nozzles upon said area. The ordinate of the diagram corresponds to degrees of displacement of the nozzles with respect to the horizontal reference position of the nozzle shown in Fig. 14. The horizontal lines in full indicate the center lines of the stripe convolutions generated by the nozzle A; the dotted horizontal lines indicate the center lines of the stripe convolutions generated by the nozzle B; and the horizontal lines in dot and dash indicate the center lines of the stripe convolutions generated by the nozzle C.

It should be noted from the diagrams of Figs. 14 and 16, that with a nozzle device 30 containing three radial nozzles extending 120° apart, each nozzle will project two impingement stripes upon the same wall area without retracking a prior stripe during each revolution of the nozzle device 30 about its horizontal axis, so that the total number of strips projected by the nozzle device upon this area for each of its revolutions will be six. It will also be noted that the total number of impingement stripe convolutions projected upon the tank surface during a single pass of the cleaning device over the entire tank corresponding to about 100 revolutions of the housing 10 and to about one complete revolution of the nozzle device is three hundred.

With a three nozzle device as described, a superficial but nevertheless effective coverage of the entire tank may be accomplished by an operation of about 17 revolutions of the housing 10 about its vertical pivot 11 causing the nozzle device 30 to turn about 60°. With such limited operation, about 50 jet impingement stripe convolutions will be projected upon the tank wall surfaces from top to bottom, the upper convolutions being generated by the upper nozzle going generally downward for about 60°, assuming that the cleaning device is started with nozzle A extending vertically upward. The lower convolutions are generated by the next nozzle B going generally downward and then starting upward for a total of about 60°, and the intermediate convolutions being generated by the third nozzle C going generally upward for about 60°.

With the phase offsetting action of the drives upon the housing 10 and the nozzle device 30 as described, each of the stripes projected will cut in between previously projected stripes, so that different parts of the tank wall surfaces will receive direct impingement from the jets during successive turns of the nozzle 30, as shown from the diagram of Fig. 16. It should be noted from the diagram, that the stripes by their successive projection in between previous stripes, come closer and closer together, and become more uniformly distributed, so that wider and more complete jet impingement coverage of the tank wall surfaces F is effected as the operation is continued.

The cleaning device, because of its novel phase offsetting gear ratio, lends itself easily and flexibly to effective operation according to the extent of cleaning required. For example, with a tank which has had an easily washable liquid charge, or which does not require intense cleaning because of the nature of the next prospective charge therein, one run over the tank corresponding to about 17 revolutions of the housing 10 and a 60° turn of the nozzle device 30 about its horizontal axis may be sufficient. For very stubborn cases, a number of runs corresponding to a number of turns of the nozzle device 30 about its horizontal axis may be required, each run covering a different wall area (aside from the stripe overlap by direct jet impingement).

The cleaning device may be started approximately in mid-position shown in Fig. 13 in full lines, and then lowered if desired, as shown in dot and dash lines, for more intense cleaning action, upon the lower part of the tank during subsequent runs, or may be swung sideways through the medium of the rope for action around columns or support frames, or similar "blind spots" for intense action against some selected top, side, or bottom areas of the wall.

It will be further noted from the above description that there is provided a novel pattern of cleaning the surfaces of a tank bulkhead or of a storage tank, or the like. In producing such a pattern a much quicker and more thorough cleaning job can be made of all of the surfaces of the bulkhead. The novel method of producing this pattern has been disclosed in detail along with the improved structure of the apparatus or device for providing the direction of the impinging stripes of the cleaning fluid to cut in between prior stripes and thus produce a substantially uniform actual impinging cleaning of the surfaces of the bulkhead tank. This improved structure also provides for the use of a plurality of exit nozzles which turn at a slower speed than the supporting housing to direct the cleaning fluid from the three nozzles against the surfaces of said tank in a manner that prevents retracking of the impinging fluid on the surfaces of said tank until after all of the surfaces of the tank have been covered at least once by the cleaning fluid.

While the invention has been described with particular reference to a specific embodiment, it is to be understood that it is not to be limited thereto but is to be construed broadly and restricted solely by the scope of the appended claims.

The invention claimed is:

1. A method of cleaning the walls of a tank comprising projecting a stream of cleaning liquid against said walls, rotating said stream about a first axis, rotating said stream at the same time about a second axis substantially perpendicular to the first axis and at a constant rate with respect to the rotation of the stream about the first axis, generating a considerable number of successive impingement stripe convolutions on said walls for each turn of the stream about the second axis, and causing phasic offsetting of the generated stripe convolutions for a plurality of successive turns of the stream about the second axis, whereby a rough cleaning coverage of the walls from top to bottom is attained for the first turn of the stream about the second axis and whereby the stripe impingement convolutions generated for each subsequent turn of the stream about the second axis cut inbetween the stripe impingement convolutions generated during previous turns of the stream about the second axis.

2. A method of cleaning the walls of a tank as described in claim 1, wherein for every turn of the stream about the second axis, the stream makes at least 25 revolutions about the second axis.

3. A method of cleaning the walls of a tank as described in claim 1, wherein for every turn of the stream about the second axis, the stream makes about 100 revolutions about the first axis.

4. The method as described in claim 1, comprising generating three streams at the same time all extending substantially in a plane at right angles to the second axis, and causing said streams to rotate about the second axis, while avoiding the tracking of one stream by another during any one turn of the streams about the second axis.

5. The method as described in claim 1, comprising generating three streams at the same time radiating from the second axis and arranged substantially 120° apart.

6. A device for cleaning all surfaces of a tank comprising, a turret mounted for rotation about a first axis at a predetermined rate, a nozzle supported on said turret for rotation therewith about said axis and for rotation at a predetermined rate about a second axis substantially at right angles to the first axis, said nozzle being constructed to direct a stream of cleaning liquid against said tank surfaces, and means for driving said turret and said nozzle simultaneously about their respective axes and at a speed ratio to cause said nozzle to make a fractional number of turns approximating one turn about the second axis for a considerable whole number of revolutions of the turret about the first axis, whereby phasic offsetting of the impingement stripes of said cleaning liquid projected upon the surfaces by said nozzle for successive turns of said nozzle about the second axis is effected.

7. A device for cleaning the walls of a tank as described in claim 6, wherein the nozzle makes a mixed number of turns approximating one turn about the second axis for at least 25 full revolutions of the turret about the first axis.

8. A device for cleaning the walls of a tank as described in claim 6, wherein the nozzle makes a fractional number of turns approximating one turn about the second axis for about 100 full revolutions of the turret about the first axis.

9. A device for cleaning the walls of a tank, comprising, a turret mounted for rotation about a first axis, a nozzle supported on said turret for rotation therewith about the first axis and for rotation about a second axis substantially at right angles to the first axis and adapted to direct a stream of cleaning liquid against said walls, a motor, a first transmission between said motor and said turret to drive said turret about the first axis, a second transmission between said motor and said nozzle to drive said nozzle about the second axis, each of said transmissions including a pair of intermeshing gears, the speed ratio of one of said pairs of gears differing from that of the other pair by an amount equivalent to not more than a few teeth of one of said gears, the speed ratios between the two transmissions being such as to cause the turret to revolve about the first axis for a considerable whole number of revolutions for each fractional or mixed number of turns of the nozzle about the second axis approximating one turn and differing from one turn by a fractional amount corresponding to the difference in the speed ratios between said pairs of intermeshing gears.

10. A device for cleaning the walls of a tank as defined in claim 9, wherein each of said pairs of intermeshing gears is located at the output end of the corresponding transmission and comprises a pinion and a spur gear, and wherein the pinions in the two pairs of gears have the same number of teeth, but the spur gears differ by at least one tooth.

11. A device for cleaning the walls of a tank, comprising a turret mounted for rotation about a first axis, a nozzle structure supported on said turret for rotation therewith about said axis and for rotation about a second axis substantially at right angles to the first axis, said nozzle structure consisting of three nozzles radiating from said axis and spaced 120° apart for simultaneously directing three streams of cleaning liquid against said walls, and means for driving said turret and said nozzle structure simultaneously about their respective axes and at a speed ratio to cause said nozzle structure to make a mixed number of turns approximating one turn about the second axis for a considerable whole number of revolutions of the turret about the first axis, whereby phasic offsetting of the impingement stripes created by projecting said cleaning liquid upon the walls by said nozzles for successive turns of said nozzle structure about the second axis is effected.

12. A device for cleaning the walls of a tank, comprising a turret in the form of a housing mounted for rotation about a first axis and comprising relatively rotatable tubular parts in embracing relationship, the inner part defining a flow passageway through the turret for a cleaning liquid, the outer tubular part constituting a rigid unit, a nozzle structure at the outlet end of said passageway for projecting one or more liquid streams against said walls, said nozzle structure being mounted on said turret for rotation therewith and for rotation about a second axis substantially at right angles to the first axis, a water motor in said passageway operated by the flow of said cleaning liquid through said passageway, said turret having a sealed lubricating chamber, said tubular parts forming therebetween a juncture in communication with said passageway and leading to said chamber, bleeder conduit means extending from said juncture to prevent leakage of liquid along said juncture and into said chamber, and drive connections from said water motor to said housing and to said nozzle, at least a part of said drive connections being enclosed in said sealed chamber.

13. A device for cleaning the walls of the tank as defined in claim 12, wherein one of said tubular parts has an annular recess between said tubular parts in direct communication with said juncture and wherein the device comprises a sealing ring of packing material in said recess blocking the leakage of the liquid along said juncture towards said chamber.

14. A device for cleaning the walls of a tank comprising a housing having an inner tubular member defining a flow passageway therethrough for a cleaning liquid, a fixed outer tubular pivot member embracing said inner tubular member and constituting a rigid unit, said housing defining a sealed lubricating chamber around said pivot member, said tubular members forming therebetween a juncture in communication with said passageway and leading to said chamber, bleeder conduit means in said tubular pivot member extending from said juncture to prevent leakage of liquid along said juncture and into said chamber, an anti-friction bearing in said chamber between said housing and said tubular pivot member to support said housing for rotation about the axis of said pivot member, a water motor in said passageway driven by the flow of said liquid through said passageway, a nozzle structure on the outlet end of said passageway supported on said housing for rotation therewith and about an axis substantially at right angles to the axis of said tubular pivot member, a drive connection between said water motor and said nozzle structure, and a drive connection between said water motor and said housing comprising a spur gear in said chamber embracing said tubular pivot member and fixedly connected thereto, and a pinion in said chamber meshing with said spur gear.

15. A device for cleaning the walls of a tank as defined in claim 14, one of said tubular members having an annular recess between said members in direct communication and with said juncture, and a sealing ring of packing material in said recess blocking the leakage of the liquid along said juncture towards said chamber.

16. A device for cleaning the walls of a tank comprising a housing mounted for rotation about a first axis and defining a flow passageway therethrough for a cleaning liquid, a nozzle structure at the outlet end of said passageway for projecting one or more liquid streams against said walls and mounted on said housing for rotation therewith and for rotation about a second axis substantially at right angles to the first axis, a water motor in said passageway operated by the flow of the cleaning liquid through said passageway, said housing having a sealed lubricating chamber near one end, a shaft extending along the first axis and connected to said water motor, said shaft projecting at one end into said chamber, a tubular support for said water motor embracing said shaft with a snug rotative fit and extending to a region near one end of said chamber, drive connections from said shaft to said housing and to said nozzle structure, at least a part of said drive connections being enclosed in said sealed chamber, a shaft sealing device blocking leakage of liquid from said passageway along the juncture between said shaft and said tubular water motor support and into said chamber and for preventing lubricant from leaking from said chamber, and bleeder conduit means leading from said shaft at a region between said water wheel tubular support and said chamber for draining liquid which has leaked along said juncture, before said leakage liquid reaches said chamber.

17. A device for cleaning the walls of a tank comprising a housing mounted for rotation about a first axis and defining a flow passageway therethrough for a cleaning liquid, an outlet tube extending along a second axis substantially at right angles to the first axis and mounted for rotation with said housing about the first axis, a nozzle structure having a hub journalled on said tube for rotation thereabout and defining with said housing a sealed lubricant chamber, a water motor in said passageway operated by the flow of said cleaning liquid through said passageway, a drive connection from said water motor to said housing, and a drive connection from said water motor to said nozzle structure having a part enclosed in said chamber, said hub being a rigid unit and having one or more bleeder passages extending from said juncture to drain out the liquid which has leaked along said juncture before the leaked liquid reaches said chamber.

18. The method of cleaning the walls of a tank comprising projecting a stream of cleaning liquid against said walls, rotating said stream about a first axis, rotating said stream at the same time about a second axis substantially perpendicular to the first axis and at a constant rate with respect to the rotation of the stream about the first axis, generating at equally spaced intervals upon each wall from a starting point thereon a first series of successive impingement stripes substantial in number and progressing away from said starting point and then towards said starting point until a return region near said starting point is reached at the end of the series, causing the stripe generated at said return region at the end of the series to be out of coincidence with the stripe generated at said starting point at the beginning of the series, continuing from said return wall region the rotation of said stream about the first axis and at the same time continuing the rotation of said stream about the second axis at said constant rate with respect to the rotation of said stream about the first axis, thus generating another series of stripes on said wall similar to the first series of stripes, and causing phasic offsetting of the stripes of said other series from the stripes of the first series to cut in between the stripes of the first series.

References Cited in the file of this patent

UNITED STATES PATENTS

| | | |
|---|---|---|
| 610,926 | Svetterle | Sept. 20, 1898 |
| 821,250 | Miller | May 22, 1906 |
| 1,495,713 | Phillips | May 27, 1924 |
| 1,657,990 | Blovin | Jan. 31, 1928 |
| 1,775,162 | Fisk | Sept. 9, 1930 |
| 1,806,740 | Butterworth | May 26, 1931 |
| 1,876,607 | Butterworth | Sept. 13, 1932 |
| 2,045,752 | Butterworth | June 30, 1936 |
| 2,078,566 | Fletcher | Apr. 27, 1937 |
| 2,105,458 | Johnson | Jan. 11, 1938 |
| 2,120,784 | Howald | June 14, 1938 |
| 2,208,813 | Ostling | July 23, 1940 |
| 2,483,976 | Main | Oct. 25, 1949 |
| 2,525,652 | Cunningham | Oct. 10, 1950 |
| 2,661,241 | Veneziano | Dec. 1, 1953 |

FOREIGN PATENTS

| | | |
|---|---|---|
| 496,231 | Great Britain | Nov. 28, 1938 |